May 19, 1953

A. M. SKELLETT 2,639,401

ELECTROOPTICAL TRANSLATING SYSTEM

Filed Sept. 7, 1946

ALBERT M. SKELLETT
INVENTOR.

BY John J. Rogan

ATTORNEY

May 19, 1953 — A. M. SKELLETT — 2,639,401
ELECTROOPTICAL TRANSLATING SYSTEM
Filed Sept. 7, 1946 — 4 Sheets-Sheet 2
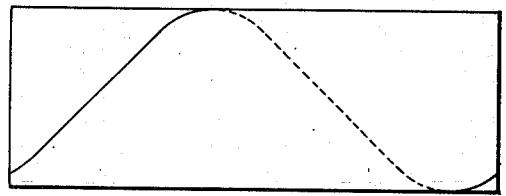
Fig. 5.
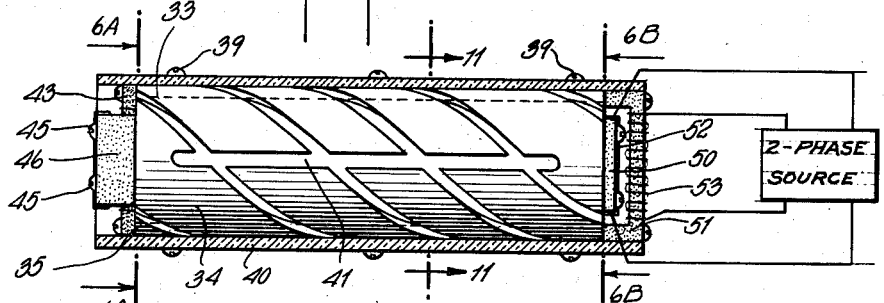
Fig. 6.
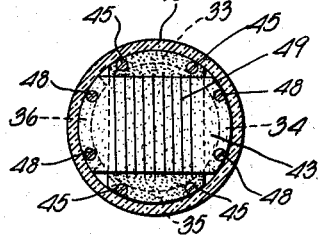
Fig. 7.
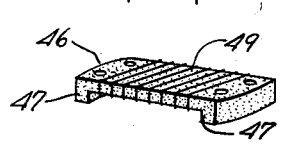
Fig. 8. / Fig. 10.
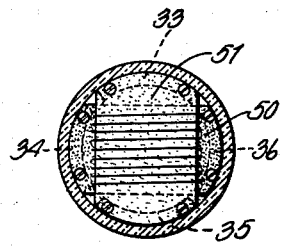
Fig. 9.
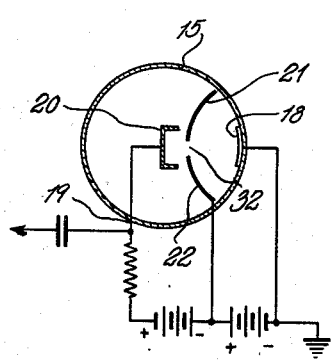
Fig. 12.
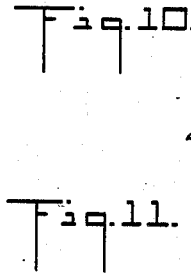
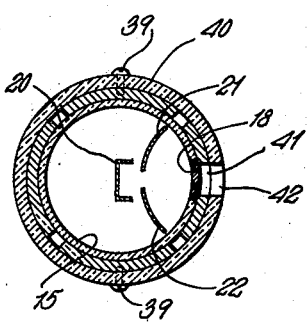
Fig. 11.
ALBERT M. SKELLETT
INVENTOR.
BY John J. Rogan
ATTORNEY

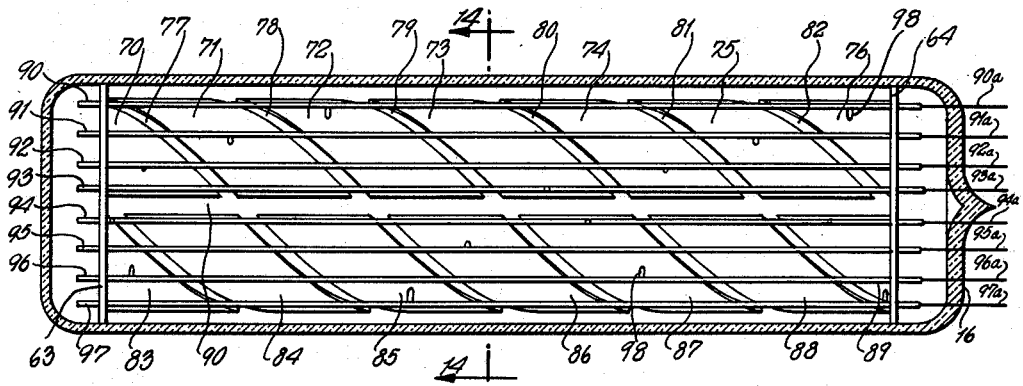

May 19, 1953  A. M. SKELLETT  2,639,401
ELECTROOPTICAL TRANSLATING SYSTEM
Filed Sept. 7, 1946  4 Sheets-Sheet 4
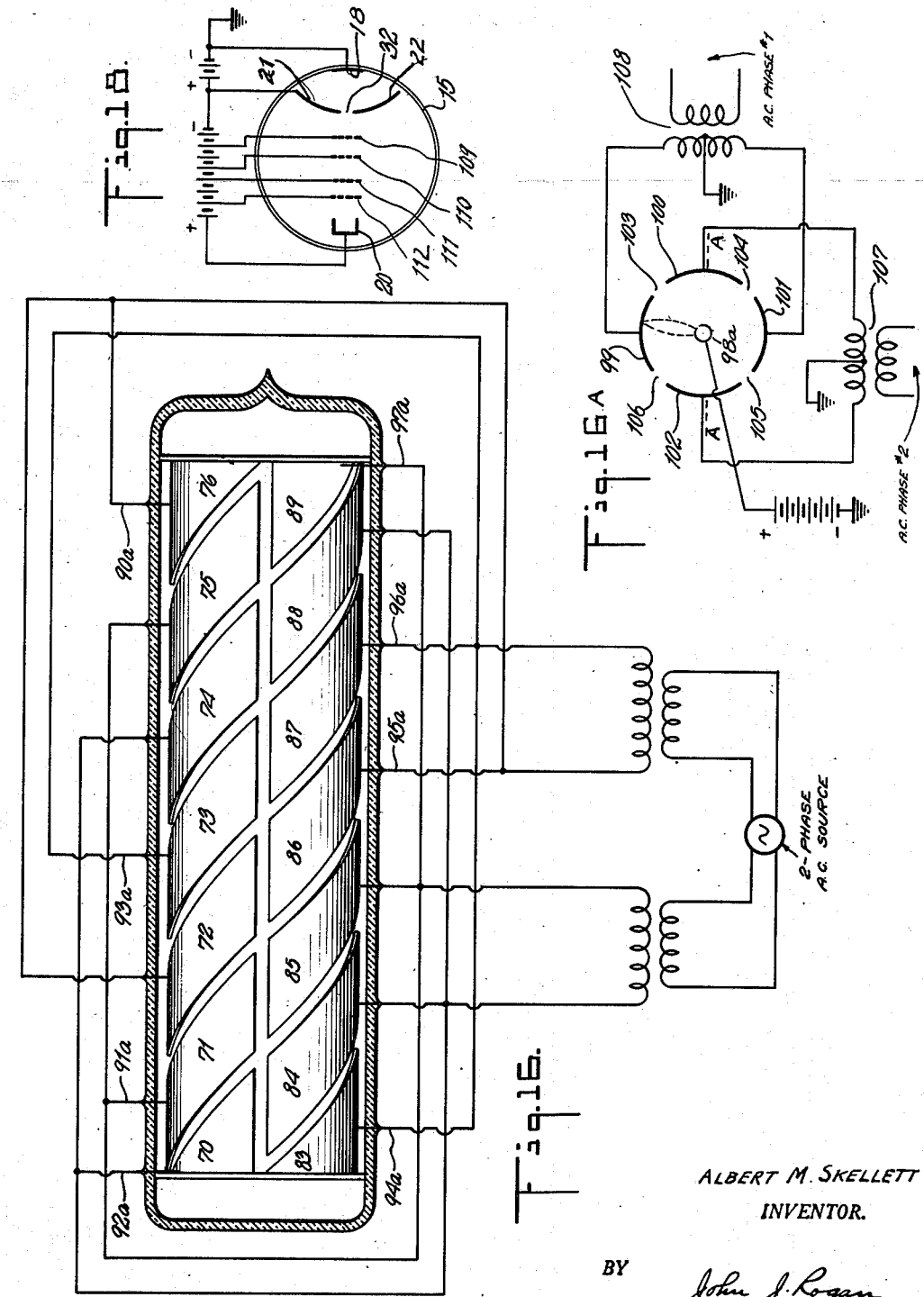
ALBERT M. SKELLETT
INVENTOR.
BY John J. Rogan
ATTORNEY Patented May 19, 1953

2,639,401

UNITED STATES PATENT OFFICE 2,639,401

ELECTROOPTICAL TRANSLATING SYSTEM

Albert M. Skellett, Madison, N. J., assignor to National Union Radio Corporation, Newark, N. J., a corporation of Delaware Application September 7, 1946, Serial No. 695,529

24 Claims. (Cl. 315—10)

This invention relates to electro-optical systems and more especially to improvements in translating light values of visual representations into corresponding electric signals such as are employed in the arts of television, facsimile and the like.

A principal object of the invention is to provide an improved method and organization of apparatus for scanning subject matter for electro-optical translation.

Another principal object is to provide an improved pick-up device for television, facsimile and similar systems.

A feature of the invention resides in a novel construction of electronic tube for selectively converting the successive elemental areas of a linear illuminated strip into a series of corresponding successive electric signals.

Another feature relates to an electronic tube having a photosensitive linearly extending electrode in conjunction with a special electron focussing and electron slit arrangement, whereby electrons from different elemental areas of the photosensitive electrode can be successively and cyclically converted into electric signals.

Another feature relates to a novel construction of electron tube wherein a helically disposed magnetic field is produced and is rotated with respect to an electron pervious slit to cause successive elemental spots of an illuminated area to be translated into corresponding electric signals.

A further feature relates to a novel construction of an electronic tube having a special arrangement of electrostatic electron focussing elements which are so arranged with respect to an electron pervious slit and are so energized in relative phase displaced relation as to cause successive elemental spots of an illuminated area to be translated into corresponding electric signals.

A still further feature relates to an improved electron tube of the electrostatically focussed beam type wherein an output electrode or collector is successively excited by electrons derived from corresponding successive elemental areas of a linearly extending photosensitive cathode.

A still further feature relates to the novel organization, arrangement and relative location and excitation of parts which cooperate to provide a relatively simple electronic scanner for photo-optical translating systems and the like.

Other features and advantages not specifically enumerated will become apparent after a consideration of the following detailed descriptions and the appended claims.

Inasmuch as the present invention is concerned primarily with the scanning or electro-optical translation portions of a facsimile or television system, only those parts of such systems will be described herein as are requisite to an understanding of the inventive concept, and of certain preferred manners of carrying it into practice.

Accordingly in the drawing,

Fig. 5 is a diagrammatic perspective view explanatory of the invention.

Fig. 6 is a plan view of the electromagnetic focussing field device which is arranged to be telescoped over the tube of Fig. 2.

Fig. 7 is a left-hand end view of Fig. 6.

Fig. 8 is a right-hand end view of Fig. 6.

Fig. 9 is a detailed perspective view of one of the rotating field producing electromagnets shown in Fig. 6.

Fig. 10 is a perspective view of the other rotating field producing magnet of Fig. 6.

Fig. 11 is a transverse sectional view of the device of Fig. 6, with the tube of Fig. 2 telescopically assembled therein.

Fig. 12 is a schematic circuit diagram showing the manner of energizing the various electrodes of the tube of Fig. 2.

Fig. 13 is a plan view of a modification of the tube of Fig. 2.

Fig. 14 is a sectional view of Fig. 13, taken along the line 14—14 thereof.

Fig. 15 is a perspective view of Fig. 13.

Fig. 16 is a wiring diagram of the manner of exciting the focussing and field rotating baffles of Fig. 13.

Fig. 16A is a schematic diagram for use in explaining Figs. 13–16.

Fig. 17 is an enlarged detail view of part of Fig. 15.

Fig. 18 is a schematic representation of a further modification of the tube of Fig. 2 employing electron multiplication.

In one of its aspects, the present invention is an improvement on the known forms of television pick-up tubes such as the "Iconoscope" or "Orthicon" which are subject to a number of disadvantages such as ion burning or blackening of the photosensitive screen and the expense and difficulty of manufacture and assembly. The tube according to this invention provides a television or facsimile pick-up for both direct and indirect scanning, but which is free from the above-noted and other disadvantages of the Iconoscope type of tube. Furthermore, with the tube of the invention, it is possible to use associated circuits which are comparatively simple. In accordance with the invention, the tube is designed so as to require only one-dimensional electron scanning, whereas the Iconoscope type tube requires two-dimensional or coordinate electron scanning. This single dimensional electron scan will then correspond to the high speed or "line" scan. The low speed or "frame" scan is accomplished by a rotating mirror drum or the like.

Figure 1:
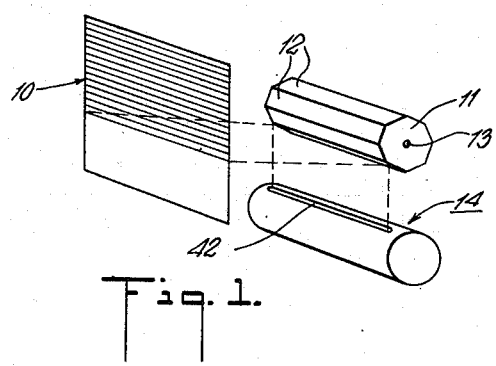
Fig. 1 is a generalized schematic and perspective view of the electro-optical scanning arrangement according to the invention as embodied in a television translation system.

The general arrangement of such a system is illustrated in Fig. 1, wherein the subject matter or view to be scanned is represented by the numeral 10. The view 10 is scanned in successive linear elements each extending across the width thereof, by means of a constantly rotating mirror drum 11 which is provided with a series of mirrors 12 arranged to form a prism around the rotational axis 13 of the drum. Since drums of this type have been known for many years in the television scanning art, further description is not needed necessary beyond stating that the number of mirrors employed is dependent upon the speed of rotation of the drum, and each mirror completely and successively scans the view 10.

Mounted conveniently adjacent drum 11 is a stationary light translating and point scanning device 14 according to the invention and which incorporates a light slit 42 so that the photosensitive element of device 14 "sees" the field of view 10 in successive parallel linear strips of the desired elemental width. The device 14 is so designed that each linear light strip of the view 10 is electronically scanned in successive elemental spots along the length of the strip. By this arrangement, the complete field of view 10 is scanned in successive elemental areas as is well-known in the television art so as to produce corresponding electric signals which can be transmitted to any well-known form of television receiver and reproducer, the scanning spot of which is synchronized in the well-known manner with the spot scanning of the field of view 10. It will be understood that the invention is not limited to so-called television. For example, the device 14 can be used for scanning a moving film or sheet of subject matter. In that case, the mirror drum 11 can be eliminated and the film or sheet 10 can be moved in the direction of its length as it is being transversely scanned by device 14. If desired, the drum 11 may take the form of any well-known rotating facsimile scanning drum around which the sheet 10 is wrapped.

Referring to Figs. 2 to 12, a description will now be given of a preferred construction and connection for the device 14. It comprises in general an electron tube having an enclosing highly evacuated glass envelope 15 with a header 16 at one end through which are sealed in a vacuum-tight manner the various lead-in and electrode support wires. A suitable exhaust tube 17 is provided for evacuating the envelope. It will be understood that the invention is not limited to the particular form of header shown.

The interior surface of envelope 15 is coated with a longitudinally extending band or strip 18 of photo electron-emissive material such as is well-known in the photoelectric cell art. This strip forms the electron-emitting cathode and extends parallel to the longitudinal axis of the tube and is of such a nature and thinness as to be substantially light transparent so that when light strikes the envelope externally along the length of strip 18, photo electrons are emitted from the said strip internally of the envelope. The cathode strip 18 is provided with lead-in conductor 18a. Mounted on the lead wire 19 is a channel-shaped electron collecting anode 20 which is in parallel longitudinal alignment with the cathode 18. Located between cathode strip 18 and anode 20 is an electrostatic field shaping and electron accelerating electrode comprising two arcuate plates 21, 22, each of which is supported at one end on the respective lead-in members 27, 28.

The anode 20 and the members 21, 22, are maintained in fixed spaced relation to each other and with respect to the cathode 18 by means of the insulator discs 23, 24, of mica or similar material, whose peripheral edges are radially toothed so as to provide a firm engagement with the interior face of the envelope. Each disc has a series of perforations to receive the rods 25, 26, respectively attached to one end of electrodes 21 and 22; and rods 27a, 28a, attached respectively to the opposite ends of said electrodes. A pair of side rod supports 29, 30, are attached to the parallel sides of anode 20. These side rods extend through corresponding perforations in discs 23, 24, one of these side rods e. g., rod 29, being electrically connected to the lead-in 19.

Figure 3:
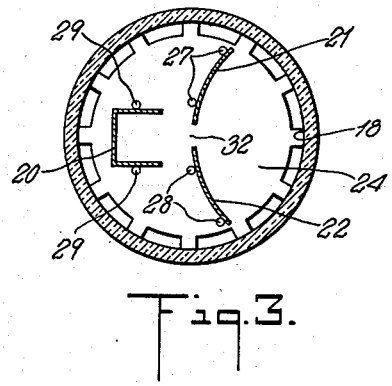
Fig. 3 is a sectional view of Fig. 2, taken along the line 3—3 thereof and viewed in the direction of the arrows.
Figure 2:
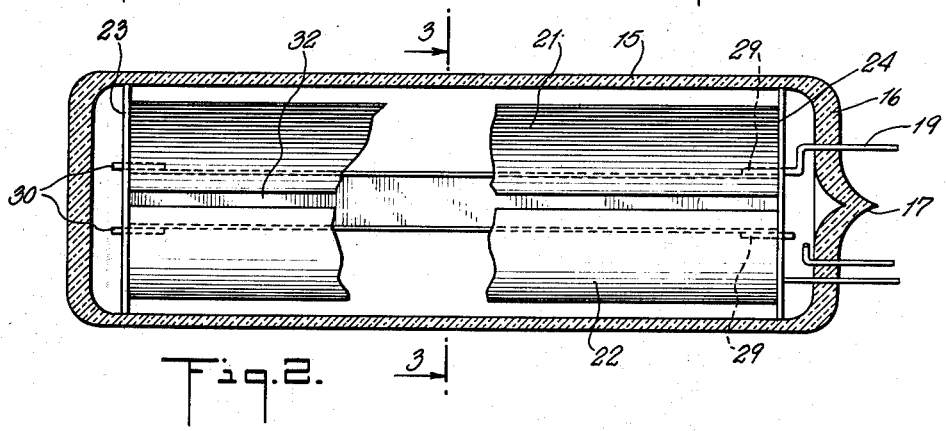
Fig. 2 is a plan view of the novel electronic tube of the invention, with the enclosing envelope or bulb in section.
Figure 4:
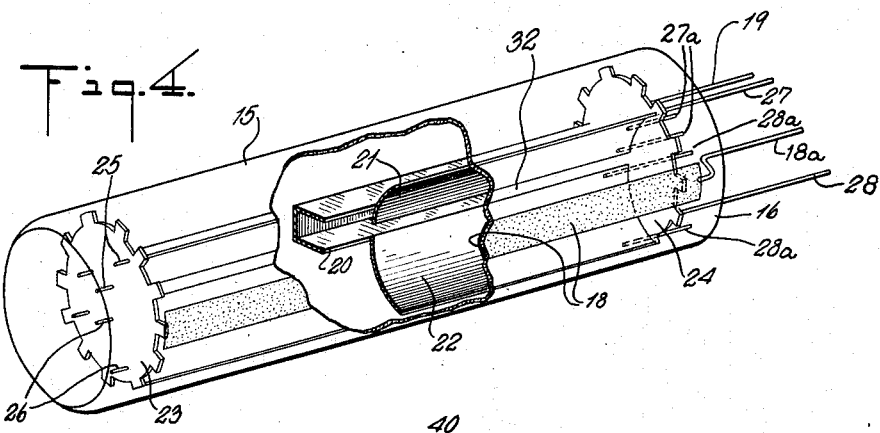
Fig. 4 is a perspective view of the tubes of Figs. 2 and 3.

As shown in Figs. 2, 3 and 4, the members 21 and 22 are mounted so that there is provided between their adjacent edges a clear longitudinal gap or slit 32, which is in parallel alignment with the length of the cathode 18 and the length of anode 20, this slit 32 being centered with respect to both cathode and anode. It will be understood that instead of forming the slit 32 by employing two separate spaced arcuate metal plates, this slit may take the form of an elongated narrow window or slit in a single but similarly arcuately curved plate. In the embodiment where members 21 and 22 are separate plates, it will be understood that they are electrically connected so as to form in effect a single continuous electrode having a central elongated slit 32.

The manner of applying the operating potentials to the respective electrodes is schematically shown in Fig. 12. The cathode 18 which emits photoelectrons when subjected to light excitations, is negatively biased with respect to members 21 and 22. Members 21 and 22 being electrically connected together, are also connected to the positive terminal of a battery or other direct current power supply 33. Thus members 21 and 22 may be positively biased to approximately 100 volts direct current with respect to cathode 18. The anode 20 is biased positively with respect to the cathode and also with respect to the members 21 and 22; for example anode 20 may have a positive direct current voltage of 150 volts applied thereto. Consequently, electrons liberated from cathode 18 will be accelerated to electrode members 21, 22, and a certain number will pass through slit 32 and impinge on anode 20. Anode 20 is channel-shaped so that secondary electrons therefrom are trapped before they can return to members 21, 22.

In accordance with the invention, the tube is subjected to a magnetic field whose strength and orientation are so arranged that the electrons which leave cathode 18 at some point come to a focus at the slit 32. In other words, there will be produced at the slit 32 at one spot only, an electronic image of a corresponding point of the photoelectric surface of cathode 18. If this magnetic field were homogeneous and entirely directed normally between the cathode 18 and the slit 32, there would be produced in the plane of the slit a complete electron image in a strip form corresponding to cathode 18. However, in order to select, for scanning purposes, successive elemental areas of this strip electron image, the image is caused to assume a helical formation and this formation is revolved at a predetermined rate with respect to the slit 32 so that in effect the slit 32 intersects with the desired rapidity successive elemental areas of the electron image.

By well-known formula, the strength of the magnetic field to accomplish focussing of the electrons at the slit 32 is obtained from the formula that equates the time of transit of the electrons between the cathode and the slit 32 with that of a single revolution of an electron around the lines of force of the magnetic field. Thus, $$H = \frac{2\pi}{D}\sqrt{\frac{m}{2e}V} \quad (1)$$

where "H" is the magnetic field strength in Gausses; "D" is the distance between slit 32 and the cathode 18 measured in centimeters; "m" and "e" are the mass and charge respectively of the electron; and "V" is the potential difference between members 21 and 22 as a unit and the cathode 18.

As pointed out above, in order to achieve the necessary successive intersecting relation between the electron image and the slit 32, the magnetic field which acts on the electrons from cathode 18 is twisted or convoluted around the central longitudinal axis of the tube in such a way that the intersection of the magnetic vector of that field and the tube wall is a helix as indicated diagrammatically in Fig. 5. Since the effective focussing action is primarily determined by the field between the members 21, 22, and the cathode, the pitch of this helix is such that the focussed electron image intersects the slit 32 in only one elemental area at a time. In addition to the helical configuration of the magnetic field, this field is rotated as a whole in screw-thread fashion about the longitudinal axis of the tube at a high speed so that the position in the tube, where the magnetic lines of force are in such a direction as to focus the photoelectrons on the slit 32, travels along the tube at high speed. This action is therefore analagous to the well-known spiral rib drum and tapper bar arrangement used in facsimile scanning systems. In this case the focussed electron image would correspond to the helical rib and the tapper bar will correspond to the slit 32. At any given instant therefore, photoelectrons from only a very restricted spot or elemental area along the length of the cathode are enabled to pass through the slit 32 and thence to impinge on the anode 20. The motion of this spot produces the high speed or "line" scan of the subject-matter as will be described subsequently.

In order to set up the particular rotating field configuration, it is necessary to employ a particular magnetic field structure which is shown in Figs. 6 to 11. In general, this field structure is tubular and is arranged to be telescoped over the envelope 15 as indicated in cross section in Fig. 11. The magnetic structure for this purpose comprises a set of four strips 33, 34, 35 and 36. In order to support the strips in their tubular formation, they may be fastened by suitable screws or rivets 39 against the interior surface of a tube 40 of Bakelite or other similar non-magnetic material. When thus assembled magnetic strips are cut to provide a longitudinally extending window or slit 41 which is adapted to register with a corresponding window 42 in the Bakelite tube 40, and also with the cathode 18 as indicated in Fig. 11.

Figure 6A:
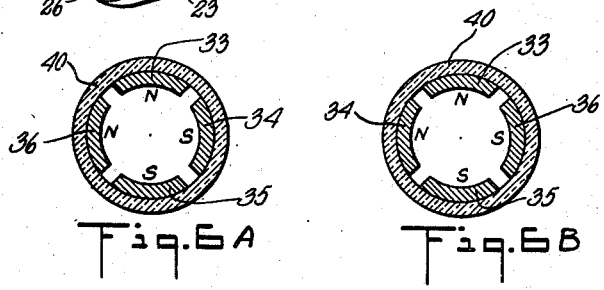
Fig. 6A is a cross-sectional view of Fig. 6 taken along the line 6A thereof.
Figure 6B:
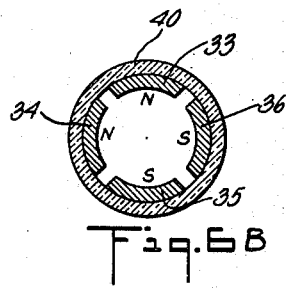
Fig. 6B is a cross-sectional view of Fig. 6 taken along the line 6B thereof.

As will be seen from the views of Figs. 6A and 7, the left-hand ends of the strips form in effect four separate magnetic poles. Likewise, the right-hand ends of these strips, as seen in Figs. 6B and 8, forms a similar set of four magnetic poles. Fitted into the end of member 40 is a soft iron magnetizing core 43 (Fig. 9) which has a magnetizing winding 44; the ends of this core abutting against the ends of strips 33 and 35, to which they may be fastened by screws 45. Another magnetizing core 46 (Fig. 10) is mounted at right angles to core 43, and has raised ends 47, so as to fit over core 43. The ends of core 46 abut against the ends of strips 34 and 36 to which they may be fastened by screws 48. Core 46 is also provided with a magnetizing winding 49.

Likewise, fitted into the right-hand end of member 40 are two crossed magnetic cores 50, 51, each with its respective magnetizing winding 52, 53. The ends of core 50 abut against the ends of strips 34 and 36; while the ends of core 51 abut against strips 33 and 35. When the various windings are connected to a two-phase alternating current supply a rotating magnetic field is produced and because of the helical arrangement of the magnetic strips 33, 34, 35 and 36, the electrons from successive elemental areas along the length of cathode 18 are successively brought to focus in the plane of slit 32, whence they pass to the anode 20. This produces corresponding potential variations at the anode 20 which can be amplified in any suitable amplifier, thus producing output voltages which represent the actual variations in light intensity on successive elemental areas of the cathode 18. These output voltages after amplification can be transmitted to a television or facsimile receiving station in any manner well-known in the art.

The invention is not limited to the focussing and scanning of the photoelectric cathode under control of the electrostatic electrodes 21, 22, and the two sets of magnetizing windings. Thus, there is shown in Figs. 13 to 17, an arrangement wherein the focussing and scanning is effected entirely by electrostatic means. In this embodiment, the glass bulb 60 has a flattened side wall 61, on the interior face of which there is applied centrally and longitudinally thereof, the strip photoelectric cathode 62 which emits photoelectrons when illuminated. Mounted within envelope 60 and positioned between the toothed mica spacers 63, 64, is a channel-shaped anode or electron collector 65. Also fastened to the micas and extending therebetween are two parallel metal side rods or uprights 66, 67 (Fig. 14). Insulatingly fastened to side rods 66, are seven arcuately shaped metal strips or baffle plates 70 to 76, each strip being cut to the shape of a sector of a helix with successive strips spaced apart slightly along the length of the side rods. In effect therefore, the plates 70—76 may be considered as the equivalent of electrode 21 (Fig. 2) with a series of spaced and helically parallel slits 77—82 cut therein. A similar series of spaced helical metal plates 83—89 are insulatingly supported on side rod 67 with the helical spaces therebetween in helical array with the corresponding helical spaces 77—82. The plates 83—89 may then be considered as the equivalent of plate 22 (Fig. 2) with a series of helical slits therein. The two sets of helical plates are mounted so that there exists between the adjacent straight edges, a single continuous slit 90A which is equivalent to the slit 32 and being in alignment with the cathode 62. Extending transversely along the plates 70—76 in slightly spaced relation thereto are four parallel conductors 90, 91, 92, 93. Likewise extending transversely to the plates 83—89 and in spaced relation thereto are the parallel conductors 94, 95, 96, 97. These conductors pass through corresponding perforations in the mica spacers 63, 64 and are provided with corresponding lead-in conductors 90a—97a through the header 16. The various rods 90—97 are connected to the respective helical plates as schematically illustrated in Fig. 16. For this purpose individual connector tabs or lugs 98 may be provided between the rods and the particular plates to which they are connected. The plates of the two sets are adapted to be connected to a two-phase alternating current supply as indicated schematically in Fig. 16, the anode 65 being provided with a separate lead-in connection for applying a suitable direct current positive potential thereto, and a separate lead-in connection being sealed through the bulb to make contact with the cathode 62.

In order to understand the focussing action of the tube of Figs. 13–17, reference may be had to Fig. 16A, which show schematically a section through a cylindrical structure taken at right angles to the longitudinal axis thereof, it being understood that the various parts are enclosed within a suitably evacuated envelope and provided with the necessary lead-ins. In the center is a cylindrical cathode 98a, e. g. of the kind commonly used in radio receiving tubes of the alternating current heater type. The surrounding elements or plates 99, 100, 101, 102, are respectively sections of a cylindrical conductive surface which has been divided into four equal cylindrical sectors with intervening linearly extending parallel gaps 103, 104, 105, 106. By connecting two quadrature-phase alternating current potentials as indicated by transformers 107 and 108 to the members 99—102 as shown, and by grounding the cathode 98a, there is produced within the enclosure between the cathode and the members 99—102, a substantially uniform electrostatic field which rotates about the longitudinal axis of the system at the cyclical frequency of the alternating current supplied to transformers 107 and 108. At any given instant, there is a positive potential gradient on one side of the cathode extending radially therefrom, and a negative potential gradient on the other side thereof. I have found that if the potential of the cathode is varied with respect to the average direct current potential on the plates 99—102 in a positive direction, the electrons which leave the positive side of the cathode will be focussed in a sharp radial beam as shown. By choosing suitable dimensions and parameters, the outer edge of the focussed beam where it strikes the member 99 for example, will be a relatively sharp linear electron image of the length of the cathode, this image extending parallel to the various slots 103, 104, 105, 106. Now, if instead of having the members 99—102 in the form of simple cylindrical sectors, each member is twisted along the axis so that each member as shown in Figs. 13–16 is part of a helix, the electron beam instead of being of a simple radial sheet-like configuration, is twisted into a flat radial spiral. However, since, in the embodiment of Figs. 13–16, the object is to focus the electrons at only one location around the periphery of the surrounding helical cylindrical surface, one-half of the cathode 98a can be omitted, and the corresponding half of the structure can also be omitted, e. g. that below the line A—A (Fig. 16A). The omission of this one-half of the structure does not seriously interfere with the above-described action of the remaining half, as I have experimentally found. Thus, the cathode 98a can take the form of the cathode 62 (Figs. 13–16) with the result that at any given instant a particular elemental area of the cathode alone is electrostatically imaged at the slot 90.

In connection with the embodiment of Figs. 2–12, the result of the action of the rotating magnetic field therein disclosed, is similar to that just described for the electrostatic field embodiment of Figs. 13–16. In other words, instead of employing a simple uniformly rotating magnetic field, this field is twisted by the magnetic strips shown in Fig. 6 to impart to the field a spiral formation. For a detailed description of the magnetic type of focussing as distinguished from the electrostatic form, reference may be had to my article in the Bell System Technical Journal for April 1944.

It will be understood that the anode 20 if desired can be replaced by any well-known electron multiplier so that the original focussed photoelectrons which pass through the slit 32 are multiplied by a large factor. Such an arrangement is schematically illustrated in Fig. 18 from which it will be seen that the orientation of the magnetic field for producing the focussing and scanning action above described is also in the proper orientation for causing the electrons to be subjected to electron multiplication at the successive multiplier electrodes. In Fig. 18, the parts corresponding to those of Figs. 2 to 12, bear the same designation numerals. Merely for purposes of simplicity, the magnetic field-producing means of the embodiment of Figs. 2 to 12 is omitted in Fig. 18. In this embodiment, the focussed electrons after passing through the slot 32 in the manner above described, traverse successively a series of foraminous electrodes or grids 109, 110, 111, 112, located between the slot 32 and the collector electrode 20. The wires of grids 109 to 112 are coated with secondary electron-emissive material and each successive grid is biased at a higher positive potential than the preceding grid. By well-known electron multiplier action, the number of electrons finally reaching the electrode 20 is greatly multiplied as compared with the structure of Figs. 2–12. When the tube 15 is surrounded by a spiral and rotating magnetic field-producing means such as that disclosed in Fig. 6, this magnetic field falls along the axis of the grids 109—112 in the proper orientation to keep the released secondary electrons in the proper trajectories so as to reach the collector electrode 20.

What is claimed is:

1. Electron tube apparatus, comprising an evacuated closing envelope containing an elongated linear photoelectric cathode extending parallel to the length of the axis of the envelope and arranged to be excited in accordance with different light values along its length, an electron collector electrode, means located between the cathode and collector electrode defining an electron permeable slit extending in spaced parallelism with the cathode and arranged to form an electron image of the said cathode excitation, a plurality of field-producing elements arranged in helical arcuate array and with the arcuate curvature at least partially surrounding said cathode along its length, and means to energize said elements to set up an electron deflecting field having a helical trajectory with respect to said slit and for rotating said field around an axis parallel to said cathode to cause successive elemental sections of said electron image to register successively with said slit.

2. Electron tube apparatus according to claim 1 in which said cathode is partly light transparent and is attached to the inner surface of the envelope wall.

3. Electron tube apparatus according to claim 1 in which said evacuated enclosing envelope has a flattened wall portion, and said photoelectric cathode is coated on the inner surface of said flattened wall portion.

4. An electron tube having a photoelectric cathode, an anode, electron-focussing means, means defining an electron permeable slit, means to produce at said slit an electron image of the light excitation along a linear strip of said cathode, and means to set up within the tube a rotating magnetic field to cause successive elemental sections of said electron image to register with said slit and thereby pass to said anode.

5. An electron tube apparatus according to claim 1, in which the last-mentioned means includes a plurality of metal plates for producing a rotating electrostatic electron deflecting field.

6. An electron tube having a photoelectric cathode, an anode, an intervening electric field shaping electrode having an electron permeable slit in registry with said cathode and anode, means to set up within the tube a magnetic field having a magnetic vector which describes a substantially helical path with relation to said slit, and means to rotate the magnetic field around said slit to cause electrons from successive elemental sections of the cathode to pass therethrough to the anode.

7. An electron tube having a photoelectric linear cathode, means defining an electron permeable slit in alignment with and parallel to said linear cathode, an anode for receiving photoelectrons after passage through said slit, electric field forming and electron accelerating electrode means between said cathode and anode, means surrounding the longitudinal axis of the tube for setting up a magnetic field whose magnetic vector intersects the tube wall in a substantially helical path, and means to rotate said field around the axis of the tube to cause electrons from successive elemental sections of said linear cathode to pass through said slit to said anode.

8. An electron tube having a photoelectric cathode, means defining an electron permeable elongated slit extending parallel to the longitudinal dimension of the cathode, a pair of electrode elements on opposite boundaries of said slit, means including said electrode elements and magnetic field producing means for normally producing at said slit an electron image of only one elemental section of the cathode, and means to variably excite said field to produce at said slit an electron image of each succeeding elemental section of the cathode.

9. An electro-optical translation system, comprising an evacuated enclosing envelope containing an elongated linear photoelectric cathode arranged to be excited in accordance with different light values along its length, an electron collector electrode, means located between the cathode and collector electrode defining an electron permeable slit and arranged to form an electron image of the said excitation along said cathode, electron deflecting field producing means mounted adjacent said cathode and slit, and a polyphase alternating current source for energizing the last-mentioned means to rotate said field around an axis parallel to said cathode for cyclically and recurrently causing said electron image to intersect said slit in successive elemental areas.

10. An electron tube according to claim 8 in which said magnetic field-producing means includes a helical convoluted magnetic member having a helical magnetic gap between adjacent convolutions, and means to excite said magnetic member by poly-phase alternating currents.

11. An electron tube according to claim 8 in which said magnetic field-producing means includes means defining a magnetic field which surrounds said slit in a helical path.

12. An electron tube having a substantially linear photoelectric cathode, a pair of electron accelerating electrodes defining a single electron permeable slit parallel to said cathode, an electron collector electrode for receiving photoelectrons after passage through said slit, a tubular magnetic member surrounding said tube and having an elongated window in alignment with said cathode said tubular magnetic member being helically arranged around said tube, and means to excite said magnetic member by polyphase alternating current to produce within the tube a rotating magnetic field having a magnetic vector which traces a helical path around said slit.

13. An electron tube comprising an evacuated envelope, a linear strip of electron-emissive material on the inside surface of said envelope, a pair of curved metal plates acting as electron accelerators and defining between their adjacent edges an electron permeable slit in registry with said strip of emissive material, an electron collector electrode mounted to receive electrons from said strip after passage through said slit, a tubular member arranged to telescope over said envelope, said tubular member having a wall of non-magnetic material with a window in optical alignment with said strip and carrying tubular magnetic means defining a helical magnetic field, field coils attached to said magnetic means, and means to energize said field coils in phase displaced relation to cause the magnetic field within the tube to rotate around the longitudinal axis thereof.

14. An electron tube of the magnetron type having a substantially linear electron-emitting cathode, an anode, accelerator and electron field forming electrodes between the cathode and anode defining a single electron permeable slit in alignment with the cathode, and means to subject the electrons from the cathode to a rotating magnetic field to successively cause electrons from successive elemental sections of cathode to be brought to registry with said slit.

15. An electron tube according to claim 14 in which said field-forming electrodes constitute an electric baffle between the cathode and anode whereby only the magnetically focussed electrons from said successive elemental sections of the cathode pass through said slit to the anode.

16. An electron tube according to claim 14 in which the last-mentioned means includes magnetic pole pieces which are excited by poly-phase alternating current to produce a rotating magnetic field within the tube for the purpose of effecting the registry with said slit of the electrons from said successive elemental sections of the cathode.

17. An electro-optical translation system comprising an electron tube of the rotary focussed electron beam type, having a substantially linear electron-emitting cathode, an anode, an electron baffle located between the cathode and anode, said baffle having a series of plates staggered along the longitudinal axis of the tube, said baffle having an elongated electron permeable slit in registry with said cathode, and means to apply poly-phase alternating current potentials to said plates to cause electrons only from successive elemental sections of the cathode to be brought into registry with said slit.

18. An electro-optical translation system, comprising an electron tube of the rotary focussed electron beam type, said tube having a substantially linear electron-emitting cathode, an anode, an electron baffle located between the cathode and anode, said baffle being constituted of a plurality of plates staggered along the longitudinal axis of the tube and with the baffle having means defining an elongated electron permeable slit in registry with said cathode, said plates being arranged in sets with the plates of each set being in alignment longitudinally of the tube the adjacent edges of the sets of plates defining said electron permeable slit with the plates of one set aligned with corresponding plates of the other set at an angle to said slit the adjacent plates of each set being separated from each other and connected to a source of polyphase alternating current whereby the electrons from successive elemental sections of said cathode are brought substantially to focus at said slit.

19. An electro-optical translation system comprising an electron tube of the type described, comprising an evacuated enclosing envelope, an electrode mount within the envelope comprising a pair of parallel metal uprights, a set of curved electron baffle plates attached to one upright, another set of curved electron baffle plates attached to the other of said uprights, the plates of the said first set being spaced apart longitudinally of their upright, the plates of the second set also being spaced longitudinally of their upright to define between the plates of each set a gap extending at an angle to the longitudinal axis of the tube and the adjacent edges of the first and second sets of plates being spaced apart to define an electron permeable slit extending longitudinally of the tube, a linear electron-emitting cathode in alignment with said slit, an electron collector electrode in alignment with said slit to receive electrons passing through said slit, and means to energize said plurality of plates in phase displaced relation to cause electrons from successive elemental areas of the cathode to pass through the slit to said collector electrode.

20. An electro-optical translation system comprising an electron tube having a linearly extending photoelectric-emissive cathode, an anode, a set of curved metal plates, means defining an electron permeable slit extending substantially parallel to the length of said cathode, and means to energize the plates of said two sets respectively from a two-phase alternating current supply to cause the electrons from successive elemental areas of the cathode to be successively brought into registry with said slit.

21. A system tube according to claim 20 in which each of said plates is curved to the form of a helical section.

22. An electro-optical translation system comprising an electron discharge tube having an evacuated envelope enclosing an elongated electron-emitting cathode, a plurality of curved metal plates each at least partially surrounding said cathode as a cylindrical helical sector, means to apply a relative potential gradient between said cathode and plates to concentrate the electrons from the cathode into a rotating beam whose edge strikes said plates, the last-mentioned means including a source of two-phase alternating current for energizing said plates respectively therefrom to cause said beam to rotate and scan said plates in cyclical succession, said plates being twisted each to the form of a helical section to cause said beam to have a flat helical configuration so that during its rotation successively different restricted portions of the beam intersect said slit.

23. Electron discharge apparatus comprising an evacuated envelope enclosing a linearly extending electron-emitting cathode, a plurality of electron beam concentrating plates each of which in a planar section perpendicular to the length of said cathode is in the form of a circular arc, each plate being twisted along the length of the cathode to the form of a helical sector, means defining an electron permeable slit substantially parallel to said cathode, and means to energize said plates in phase displaced relation to cause the electrons from said cathode to form a flat helical beam succeeding elements of which successively intersect said slit.

24. Electron discharge apparatus comprising a substantially linearly extending electron-emitting cathode, an anode for said cathode, a plurality of curved metal plates having means to define an electron permeable slit substantially parallel to said cathode, means to energize said plates relatively to the cathode to produce a concentrated electron image of the cathode length, means to set up in the space between the cathode and said plates a magnetic field having a substantially flat helical configuration, and means for rotating said field uniformly to cause the electrons in successive restricted sections of said beam successively to intersect said slit.

ALBERT M. SKELLETT.

References Cited in the file of this patent

UNITED STATES PATENTS

| Number | Name | Date |
| --- | --- | --- |
| 1,161,734 | Rosing | Nov. 23, 1915 |
| 1,747,791 | Peterson | Feb. 18, 1930 |
| 1,898,080 | Culver | Feb. 21, 1933 |
| 1,934,437 | Lucas | Nov. 7, 1933 |
| 2,161,859 | Geffcken et al. | June 13, 1939 |
| 2,226,658 | Browde | Dec. 31, 1940 |
| 2,315,288 | Knoop | Mar. 30, 1943 |
| 2,315,621 | Ives | Apr. 6, 1943 |
| 2,459,778 | Larson | Jan. 18, 1949 |
| 2,467,786 | Toulon | Apr. 19, 1949 |